No. 704,452. Patented July 8, 1902.
C. B. FAIRCHILD.
VEHICLE BRAKE.
(Application filed Sept. 16, 1901.)
(No Model.) 3 Sheets—Sheet 1.
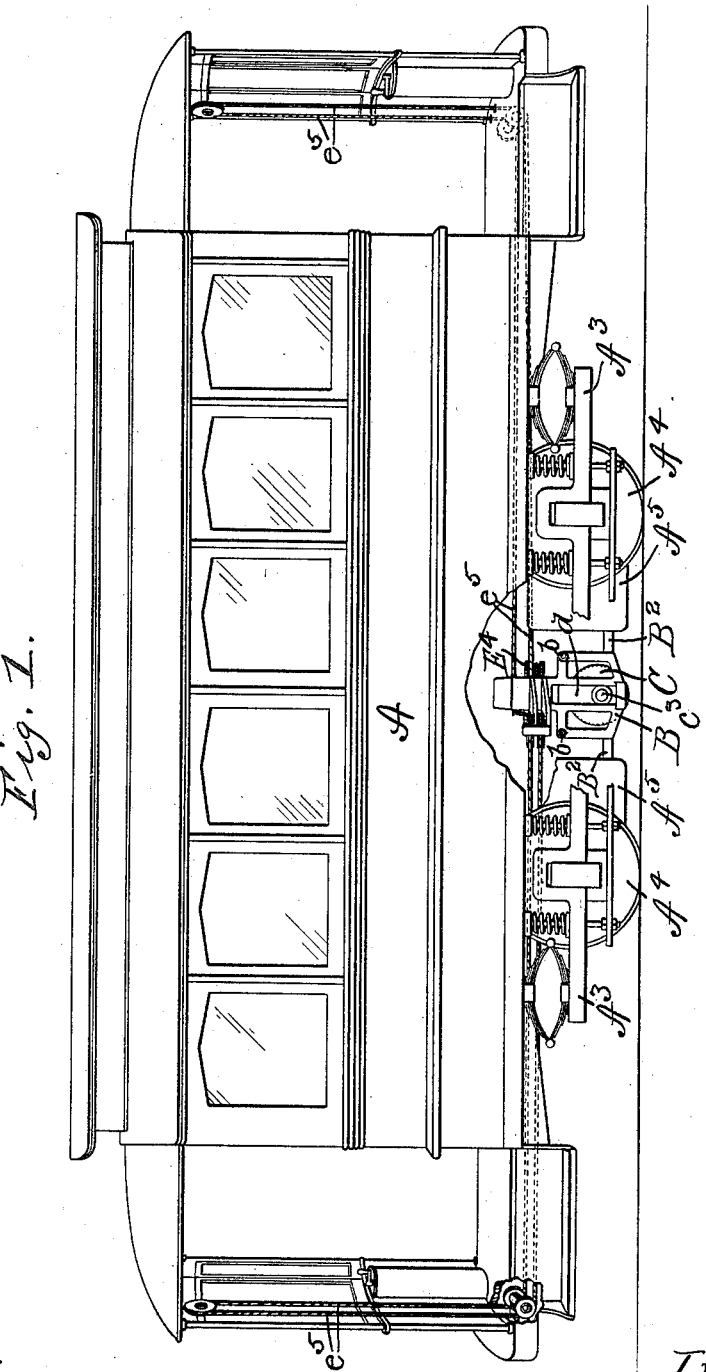
Witnesses.
Wm. A. Dreffein.
Ray White.
Inventor.
Charles B. Fairchild,
by Geo. P. Waldo,
atty.

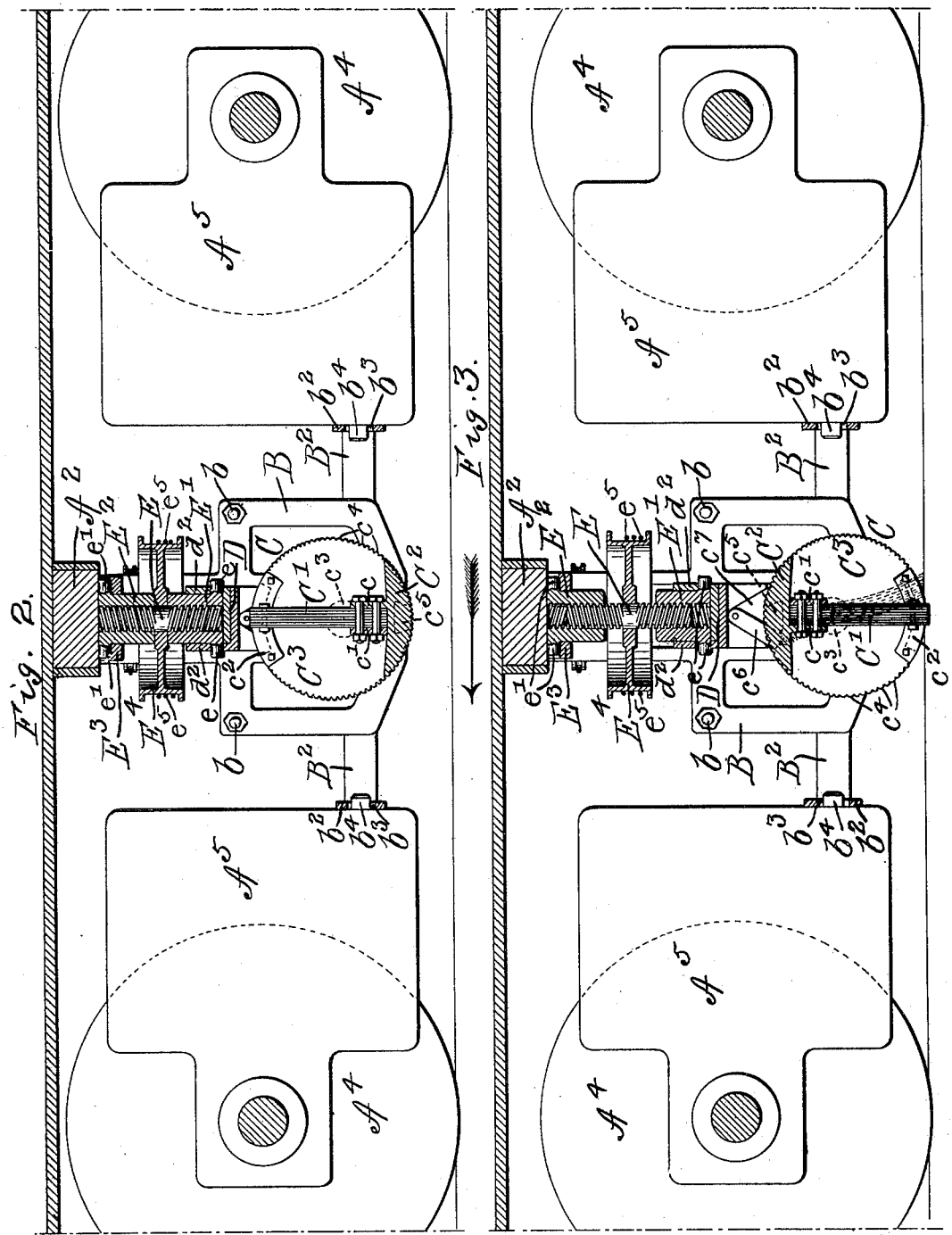

No. 704,452. Patented July 8, 1902.
C. B. FAIRCHILD.
VEHICLE BRAKE.
(Application filed Sept. 16, 1901.)
(No Model.) 3 Sheets—Sheet 3.
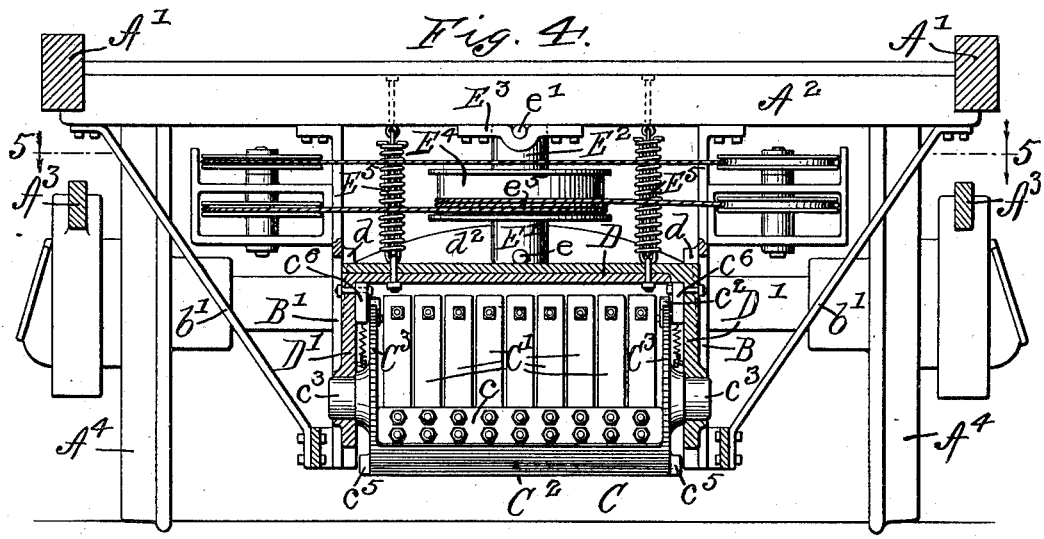
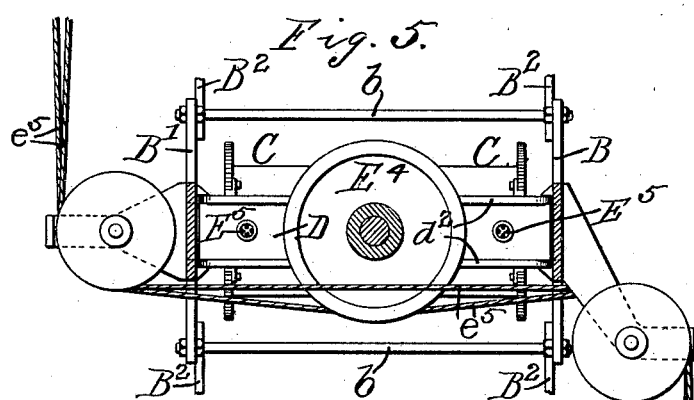
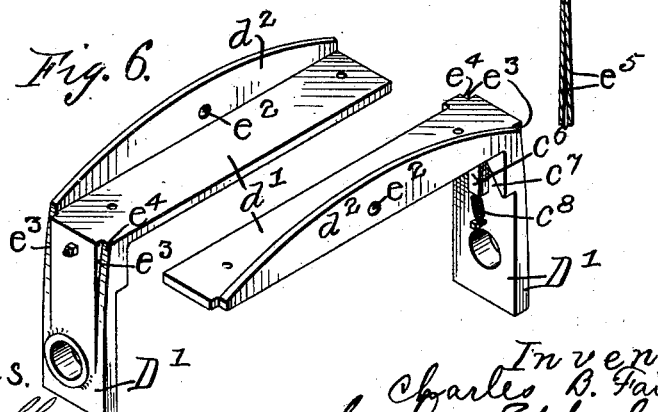
Witnesses. Inventor,
Wm A. Dreffein. Charles B. Fairchild,
Ray White. by Geo. E. Waldo,
att.

UNITED STATES PATENT OFFICE.

CHARLES B. FAIRCHILD, OF NEW YORK, N. Y.

VEHICLE-BRAKE.

SPECIFICATION forming part of Letters Patent No. 704,452, dated July 8, 1902.

Application filed September 16, 1901. Serial No. 75,467. (No model.)

*To all whom it may concern:*

Be it known that I, CHARLES B. FAIRCHILD, a citizen of the United States, and a resident of New York city, in the county of New York and State of New York, have invented a Vehicle-Brake, of which the following is a specification.

This invention relates to brakes, and relates particularly to what may be termed "pavement-brakes" of the general type heretofore patented to me by Letters Patent of the United States No. 569,150, dated October 6, 1896.

Among the objects of my present invention are to simplify the construction of brakes of this type, thus reducing their cost, to provide improved and simplified means for supporting and operating said brakes, to provide means to insure the intended operation of the brake, and generally to provide a brake of this type which will be relatively simple, cheap, and efficient.

A brake embodying my present invention consists of the various features, combinations of features, and details of construction hereinafter described and claimed.

In the accompanying drawings a brake of my invention is fully illustrated.

Figure 1 is a side elevation of a single-truck car equipped with a brake of my invention. Fig. 2 is a side view of a brake of my invention, partly in section, showing such parts of a car as will illustrate the application of my improved brake thereto, the brake being released or in inoperative position. Fig. 3 is a view similar to Fig. 2, showing the brake in depressed or operative position. Fig. 4 is an end view of my improved brake shown as applied to a car. Fig. 5 is a plan section on the line 5 5 of Fig. 4, and Fig. 6 is an enlarged perspective view of members of the brush-carrying head or frame.

Referring now to the drawings, A designates a car-body; A', the longitudinal floor timbers or sills thereof; $A^2$, the transverse floor-timbers; $A^3$, the truck-frame; $A^4$, the truck-wheels, and $A^5$ indicates motors adapted for propelling said car.

All of the foregoing parts are old and well known in the art and may be of any usual or desired construction.

The operative parts of the brake are supported in a frame comprising right and left hand members B B', rigidly secured to a transverse frame-timber $A^2$ between the motors $A^5$. Said lateral frame members are connected by rods $b$ and are reinforced by diagonal braces $b'$, which connect said frame members adjacent to their lower ends with the floor member $A^2$. Said supporting-frame also comprises arms $B^2$, adjacent to its lower end, the outer ends of which abut against the motors $A^5$ and receive the end thrust due to applying the brake and transmit it to said motors and through the motors to the car-axles. In the preferable construction shown the outer ends of said arms $B^2$ are connected by bars or rods $b^2$, which are preferably formed integral therewith, so that the arms $B^2$ and the bar $b^2$ on each side of said frame will form an integral piece. Preferably, also, said bars $b^2$ are provided with slots $b^3$, through which project studs or pins $b^4$ on the motor-casing. Said pins $b^4$ strengthen the arms $B^2$ when under a strain, while the slots $b^3$ provide for relative movement of the motors $A^5$ and the spring-supported car-body.

The brake-brush (designated as a whole by C) consists of a plurality of spring-brushes C', rigidly secured at one end to a rigid back or support $C^2$. As shown, the brushes C' are substantially the same as those shown and described in my said prior patent, No. 569,150, each consisting of a plurality of thin strips or laminæ of spring-steel or the like rigidly secured together. In the preferable construction shown, also, the brushes C' are bolted to a flange $c$ on the back or support $C^2$, a removable plate $c'$ being secured to the opposite sides of said brushes. Secured to the ends of the back or support $C^2$, being preferably formed integral therewith, are circular heads or disks $C^3$, the perimeters of said disks and the outer surface of said back or support forming a skeleton drum or cylinder. Preferably, also, the brushes C' extend diametrically of said cylinder, and their free ends project a short distance beyond or outside of the heads or disks $C^3$—say one and one-half inches ($1\frac{1}{2}''$.)

As practically all of the wear due to applying the brake is on the shoes $c^2$, it is obvious that by renewing said shoes as they become worn beyond their practical utility the life of said disks may be extended almost indefinitely.

Preferably, also, removable shoes $c^2$ are secured to the disks or heads $C^3$, the outer surfaces of which coincide with the surfaces of said disks and which extend circumferentially of said disks on both sides of the free ends of the brushes $C'$.

The brake-brush C is revolubly mounted in a suitable frame, so as to be bodily movable toward and from the road-bed in order to provide for lowering said brake-brush into contact with the road-bed and to raise it above and free from the same.

In the preferable construction shown the brake-brush C is mounted in said frame by means of trunnions $c^3$ on the heads or disks $C^3$, which engage suitable bearings in said frame, said trunnions being located eccentrically of said heads or drums on a diametrical line, which coincides, practically, with the center line transversely of the brushes $C'$ when in normal or unflexed position, being offset toward the attached ends of said brushes. In the preferable construction shown, also, the surface of the brake-brush C is grooved or corrugated transversely, thus forming a series of teeth or projections $c^4$, which will engage the road-bed or pavement more firmly when depressed into contact therewith than though said surface were smooth, preventing slipping or sliding of said brake-brush on the road-bed or pavement, particularly when covered with snow or ice, and thus securing the designed operation of the brake under all conditions.

Rotation of the brake-brush C in either direction is limited by suitable stops to the position shown in Fig. 3, in which the brushes $C'$ are in full engagement with the road-bed or pavement. As shown, said stops consist of lugs or projections $c^5$ on the heads or disks $C^3$, which are adapted to be brought into contact with dogs $c^6$, pivoted in recesses $c^7$, formed in the frame in which said brake-brush is mounted, the sides of said recesses forming stops adapted to limit the pivotal movement of said dogs, the relation being such that said brake-brush will be stopped in the position shown in said Fig. 3, as desired.

Owing to the greater weight of the brake-brush C on the side of the back or support $C^2$, said brake-brush when released will normally hang in the position shown in Fig. 2, thus insuring desired engagement of the brake-brush with the road-bed or pavement when said brake is applied.

Springs $c^8$, opposite ends of which are attached to the ends of the dogs $c^6$ and to a rigid portion of the brake-frame, operate to maintain said dogs normally in a central position between the sides of the recesses $c^7$, and when the brake is released by exerting a pull on the lugs or projections $c^5$ on the disks $C^3$ will obviously give the brake-brush an impulse in the direction of its normal position.

The frame in which the brake-brush C is revolubly mounted consists of a transverse member D, at the ends of which are formed arms $D'$, which are fitted to and longitudinally movable in guides or ways $d$, formed in the rigidly-supported brake-frame members B B', so as to be movable toward and from the road-bed or pavement. To provide for assembling the brake, said frame is made in two sections, each comprising an arm $D'$ and a transverse member $d'$, Fig. 6, said transverse members $d'$ being adapted to be bolted together in overlaid position to form the member D. Said transverse member D also preferably comprises flanges $d^2$, which materially strengthen and stiffen said frame.

Movement toward and from the pavement is adapted to be imparted to the brake-brush C by suitable means, which, as shown, consist of a revoluble screw E, the lower end of which is threaded to a nut $E'$, secured to the member D of the brush-carrying frame and preferably having its upper end threaded to a nut $E^2$, secured to the transverse frame-timber $A^2$. The nuts $E'$ $E^2$ and the threads on opposite ends of the screw E, which engage the same, are preferably of different lead, thus rendering the operation of said brake very quick. In the preferable construction shown also the nuts $E'$ $E^2$ are pivotally connected to the timber $A^2$ and to the frame D, so that said frame and the brake-brush C will be pivotally movable about a longitudinal axis, thus allowing the brake-brush C to adapt itself to a transversely inclined or sloping road-bed or pavement. In the preferable construction shown lugs $e$ $e'$ are formed on the nuts $E'$ $E^2$, respectively, of which the lugs $e$ engage openings $e^2$, formed in the flanges $d^2$ of the frame D, and the lugs $e'$ engage suitable bearings formed in a head or strap $E^3$, secured to the transverse frame-timber $A^2$.

As shown, the arms $D'$, in which the brake-brush C is mounted, are wider than the guide slots or grooves $d$ in the rigid frame members B B', and to provide for desired pivotal movement of said frame in the manner described it is cut away or grooved at the lateral edges of the arms $D'$, as shown at $e^3$. Provision is thus made for pivotal movement of said brake-brush and frame, while the shoulders $e^4$, formed by said grooves $e^3$, form stops which limit such pivotal movement of said brake-brush and frame.

Any desired or approved means may be employed for turning the screw E. As shown, said screw is operated by means of a cable $e^5$, applied to a drum or pulley $E^4$, secured thereto, said cable passing from said drum or pulley around suitable guide-pulleys to the platforms of the cars, so as to be accessible to the motorman. This method of operating the screw E is shown, described, and claimed in an application for United States Letters Patent filed by me in the United States Patent Office on the 2d day of July, 1901, numbered serially 66,845, and is therefore not claimed herein.

In the preferable construction shown counterbalance-springs $E^5$ connect the frame D with the frame-timber $A^2$. Said springs $E^5$ are sufficiently strong to about support the weight of said frame D and the parts carried thereby. They will thus operate to equalize the duty imposed on the screw E in raising and lowering said frame D in an obvious manner.

The operation of my improved brake is as follows: The brake-brush C being in its normal released position, (shown in Fig. 2,) the brake is applied by turning the screw E by means of the cable $e^5$, so as to depress the frame D to bring the brake-brush C into contact with the pavement or road-bed, the points of contact being at the circumference of said brake-brush the shortest radial distance from the trunnions $c^3$. Movement of the car relatively to the road-bed or pavement will operate to rotate said brake-brush into the position shown in Fig. 3, the point of contact of the brake-brush with the road-bed or pavement in this position being the greatest radial distance from said trunnions $c^3$. Rotation of said brake-brush in this manner will operate to exert a strong upward thrust on the car-body, so that practically the whole weight of said car will be supported upon said brake-brush effecting a strong frictional engagement of the brushes C' with said road-bed or pavement, which will operate to stop the car in a very short distance. The pressure on said brushes C' is limited by means of the heads or disks $C^3$, which thus supplement the braking action of said brushes and by limiting the pressure thereon prevent the same from being broken or permanently set by being flexed beyond their limit. The end thrust due to setting the brake is transmitted by the arms $B^2$ to the motors $A^6$, thus relieving the brake-frame from all but the up-thrust, which it is strongest to resist.

It is obvious that the greatest wear on the brake-brush C will be on the shoes $c^2$, which being removable may be renewed and replaced when worn out, thus increasing the life of said disks $C^3$ almost indefinitely.

When it is desired to release the brake, the cable $e^5$ is pulled so as to rotate the screw E in the direction to raise the frame D and brake-brush C. As soon as the brushes C' are raised clear of the road-bed or pavement the springs $c^3$, acting on the stop-dogs $c^6$, give the brake-brush C an impulse toward its normal position, which it ultimately assumes.

While I have herein shown my improved brake as applied to a single-truck car, it may equally well be applied to a double-truck car, and my invention contemplates this application.

I claim—

1. In a vehicle-brake of the type described, the combination with a brake-brush, of a head or frame in which said brake-brush is revolubly mounted, a rigid frame, guides or ways therein to which said brush-carrying head is fitted and is movable toward and from the road-bed or pavement, means to impart movement to said brush-carrying head or frame toward and from the road-bed or pavement and stops to limit the rotation of said brake-brush, substantially as described.

2. In a vehicle-brake of the type described, the combination with a brake-brush, of a head or frame in which said brake-brush is revolubly mounted, stops thereon to limit the rotation of said brake-brush, a rigid frame secured to and depending from the car-body, rigid supports against which the lower end of said frame abuts adapted to receive the end thrust due to the application of the brake, guides or ways in said rigid frame to which the brush-carrying frame is fitted and is movable toward and from the road-bed or pavement and means to impart movement to said brush-carrying head toward and from the pavement, substantially as described.

3. In a vehicle-brake of the type described, the combination of a brake-brush, a head or frame in which said brake-brush is revolubly mounted, stops to limit the rotation of said brake-brush, a frame rigidly supported beneath the car-body, guides or ways therein to which said brush-carrying head is fitted and is movable toward and from the roadbed or pavement and means to impart movement to said brush-carrying head toward and from the road-bed, said means comprising a screw revolubly connected to said brush-carrying head and to the car-body, the connection to one thereof comprising a nut to which said screw is threaded, and means to impart rotary movement to said screw, substantially as described.

4. In a vehicle-brake of the type described, the combination with the brake-brush of a head or frame in which said brake-brush is revolubly mounted, stops which limit the rotation of said brake-brush, a rigid frame secured to and depending from the car-body, rigid supports against which the lower end of said frame abuts adapted to receive the end thrust due to the application of the brake, guides or ways in said rigid frame to which the brush-carrying head or frame is fitted and is movable toward and from the road-bed or pavement and means to impart movement to said brush-carrying head toward and from the road-bed or pavement, said means comprising a screw revolubly connected to said brush-carrying head or frame and to the car-body, the connection to one thereof comprising a nut secured thereto to which said screw is threaded, and means to rotate said screw, substantially as described.

5. In a vehicle-brake of the type described, the combination with a brake-brush of a head or frame in which said brake-brush is revolubly mounted, stops to limit the rotation of said brake-brush, a rigid frame, guides or ways therein to which said brush-carrying head is fitted and is movable toward and from the road-bed or pavement and means to impart movement to said brush-carrying head toward and from the road-bed or pavement, said means comprising nuts of different lead secured to said brush-carrying head and to the car-body, a screw the opposite ends of which are threaded to said nuts and means to rotate said screw, substantially as described.

6. In a vehicle-brake of the type described, the combination with a brake-brush of a head or frame in which said brake-brush is revolubly mounted, stops which limit the rotation of said brake-brush, a rigid frame secured to and depending from the car-body, rigid supports against which the lower end of said rigid frame abuts adapted to receive the end thrust due to applying the brake, guides or ways in said rigid frame to which said brush-carrying head is fitted and is movable toward and from the road-bed or pavement and means to impart movement to said brush-carrying head or frame toward and from the road-bed or pavement, said means comprising nuts of different lead secured to said brush-carrying head and to the car-body, a screw the opposite ends of which are threaded to said nuts and means to rotate said screw, substantially as described.

7. In a vehicle-brake of the type described, the combination with a brake-brush of a head or frame in which said brake-brush is revolubly mounted, stops to limit the rotation of said brake-brush, a rigid frame, guides or ways therein to which said brush-carrying head or frame is fitted and is movable toward and from the road-bed or pavement and means to impart movement to said brush-carrying head toward and from the road-bed or pavement, said means comprising a screw revolubly connected to said brush-carrying head or frame and to the car-body, the connection to one thereof comprising a nut pivoted thereto, and means to rotate said screw, substantially as described.

8. In a vehicle-brake of the type described, the combination with a brake-brush, of a head or frame in which said brake-brush is revolubly mounted, stops to limit the rotation of said brake-brush, a rigid frame, guides or ways therein to which said brush-carrying head is fitted and is movable toward and from the road-bed or pavement and means to impart movement to said brush-carrying head toward and from the road-bed or pavement, said means comprising nuts of different lead pivotally connected to said brush-carrying head and to the car-body, a screw the opposite ends of which are threaded to said nuts and means to rotate said screw, substantially as described.

9. In a vehicle-brake of the type described, the combination with a brake-brush of a head or frame in which said brake-brush is revolubly mounted, stops which limit the rotation of said brake-brush, a rigid frame secured to and depending from the car-body, rigid supports against which the lower end of said rigid frame abuts adapted to receive the end thrust due to applying the brake, guides or ways in said rigid frame to which said brush-carrying head is fitted and is movable toward and from the road-bed or pavement and means to impart movement to said brush-carrying head toward and from the road-bed or pavement, said means comprising nuts of different lead pivoted to the brush-carrying head and to the car-body, a screw the opposite ends of which are threaded to said nuts and means to rotate said screw, substantially as described.

10. In a vehicle-brake of the type described, the combination with a brake-brush of a head or frame in which said brake-brush is revolubly mounted, stops to limit the rotation of said brake-brush, a rigid frame, guides or ways therein to which said brush-carrying head is fitted and is movable toward and from the road-bed or pavement, means to impart movement to said brush-carrying head toward and from said pavement, said means comprising a screw revolubly connected to said brush-carrying head and to the car-body, the connection to one thereof comprising a nut pivoted thereto to which said screw is threaded and means to rotate said screw and stops adapted to limit the pivotal movement of said brush-carrying head or frame, substantially as described.

11. In a vehicle-brake of the type described, the combination with a brake-brush of a head or frame in which said brake-brush is revolubly mounted, stops which limit the rotation of said brake-brush, a rigid frame secured to and depending from the car-body, rigid supports against which the lower end of said rigid frame abuts adapted to receive the end thrust due to applying the brake, guides or ways in said rigid frame to which said brush-carrying head or frame is fitted and is movable toward and from the road-bed or pavement, rigid surfaces on said brush-carrying head or frame which are opposite rigid surfaces on said rigid frame and diverge gradually therefrom and means to impart movement to said brush-carrying head toward and from the road-bed or pavement, said means comprising nuts of different lead pivoted to the brush-carrying head and to the car-body, a screw the opposite ends of which are threaded to said nuts and means to rotate said screw, substantially as described.

12. In a vehicle-brake of the type described, the combination with a brake-brush, of a head or frame in which said brake-brush is revolubly mounted, a rigid frame, guides or ways therein to which said brush-carrying head is fitted and is movable toward and from the road-bed or pavement, means to impart movement to said brush-carrying head or frame toward and from the road-bed or pavement and counterbalance-springs applied to said brush-carrying head or frame, substantially as described.

13. In a vehicle-brake of the type described, the combination with a brake-brush, of a head or frame in which said brake-brush is revolubly mounted, a rigid frame secured to and depending from the car-body, rigid supports against which the lower end of said rigid frame abuts adapted to receive the end thrust due to applying the brake, guides or ways therein to which said brush-carrying head is fitted and is movable toward and from the road-bed or pavement, means to impart movement to said brush-carrying head toward and from the road-bed or pavement and counterbalance-springs which connect said brush-carrying head with the car-body, substantially as described.

14. In a vehicle-brake of the type described, the combination with a brake-brush, of a head or frame in which said brake-brush is revolubly mounted, said head or frame consisting of right and left hand sections comprising overlying members rigidly secured together, a rigid frame, guides or ways therein to which said brush-carrying head is fitted and is movable toward and from the road-bed or pavement and means to impart movement to said brush-carrying head toward and from the road-bed or pavement, substantially as described.

15. In a vehicle-brake of the type described, the combination with a brake-brush comprising a back or support, heads or disks and trunnions on said heads or disks, all formed integral with each other, of a head or frame to suitable bearings in which the trunnions on said brake-brush are fitted, said head or frame consisting of right and left hand sections comprising overlying members rigidly secured together, a rigid frame, guides or ways therein to which said brush-carrying head is fitted and is movable toward and from the road-bed or pavement and means to impart movement to said brush-carrying head toward and from the road-bed or pavement, substantially as described.

16. A brake-brush for a brake of the type described, comprising a back or support to which the brushes are secured, disks secured to the ends thereof and trunnions on said disks located eccentrically thereof on the side of said brush back or support, substantially as described.

17. A brake-brush for a brake of the type described comprising a back or support, a flange thereon to which the brushes are attached, heads or disks secured to the ends of said brush back or support and trunnions on said heads or disks located eccentrically thereof on the side of said brush back or support, substantially as described.

18. A brake-brush for a brake of the type described, comprising a back or support to which the brushes are secured, heads or disks secured to the ends thereof and trunnions on said heads or disks located eccentrically thereof on the side of said brush back or support, the outer curved surfaces of said brush back or support and of said heads or disks being grooved or corrugated forming teeth therein, substantially as described.

19. A brake-brush for a brake of the type described, comprising a back or support, heads or disks secured to the ends thereof and shoes removably secured in said heads or disks which extend on both sides of the free ends of the brush-teeth when in normal unflexed position, substantially as described.

20. A brake-brush for a brake of the type described, comprising a support to which the brushes are secured and rigid cam-surfaces adapted to rotate said brake-brush in the manner described, said cam-surfaces being provided with teeth or projections, substantially as described.

21. A brake-brush for a brake of the type described, comprising a back or support to which the brushes are secured, heads or disks secured to the ends thereof, trunnions on said heads or disks located eccentrically thereof on the side of said back or support and removable shoes secured in the edges of said heads or disks which extend on both sides of the free ends of the brushes when in normal unflexed position, substantially as described.

22. In a vehicle-brake of the type described, the combination with a frame supported upon the vehicle so as to be movable toward and from the road-bed or pavement and means to impart movement to said frame toward and from the road-bed or pavement, a brake-brush revolubly mounted in said frame and stops adapted to limit the rotation of said brake-brush, of a spring or springs applied to said brake-brush and adapted to give it an impulse toward its normal position when said brake is released, substantially as described.

23. In a vehicle-brake of the type described, the combination with a frame supported upon the vehicle so as to be movable toward and from the road-bed or pavement and means to impart movement to said frame toward and from said road-bed or pavement and a brake-brush revolubly mounted in said frame, of stops adapted to limit the rotation of said brake-brush, said stops comprising a rigid projection or projections on said brake-brush and a dog or dogs pivoted upon said frame in the path of travel of said projection or projections, stops on said frame which limit the pivotal movement of said dog or dogs and springs applied to said dog or dogs adapted to maintain them normally in central position, substantially as described.

In testimony that I claim the foregoing as my invention I affix my signature, in presence of two subscribing witnesses, this 12th day of August, A. D. 1901.

CHARLES B. FAIRCHILD.

Witnesses:
W. H. MEADER,
C. W. WALDRON.